T. G. TULLOCH.
FLUID TIGHT JOINT FOR STEAM PIPES AND THE LIKE.
APPLICATION FILED JAN. 30, 1918.
1,339,636.  Patented May 11, 1920.
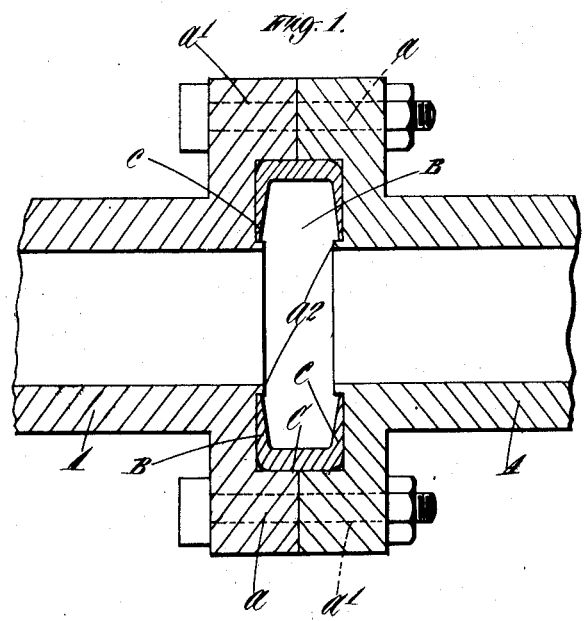
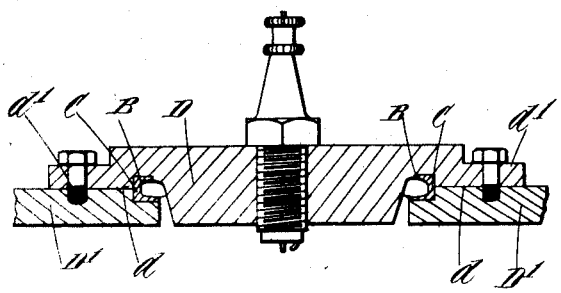

UNITED STATES PATENT OFFICE.

THOMAS GREGORIE TULLOCH, OF WESTMINSTER, LONDON, ENGLAND.

FLUID-TIGHT JOINT FOR STEAM-PIPES AND THE LIKE.

1,339,636.　　　　　Specification of Letters Patent.　　　Patented May 11, 1920.

Application filed January 30, 1918. Serial No. 214,486.

*To all whom it may concern:*

Be it known that I, THOMAS GREGORIE TULLOCH, a subject of the King of Great Britain, residing at Bank Buildings, King street, St. James', in the city of Westminster and county of London, England, have invented certain new and useful Improvements in or Relating to Fluid-Tight Joints for Steam-Pipes and the like, of which the following is a specification.

This invention relates to fluid tight joints suitable for superheated steam pipes, exhaust pipes or joints of engines, engine cylinders made in two parts or with inspection covers and for other cases where tubes or cylindrical members require to be connected in a fluid tight manner.

According to this invention the ends of the jointed members are each formed with an annular recess or rabbet in the adjacent faces, in which recess a cupped ring of flexible steel or other highly resilient hard metal is placed, the edges or sides of which are slightly compressed when the jointed members are drawn together by bolts or other suitable means. The tube or cylinder ends are usually flanged and the recess is formed in the face of each flange while the outer edge of the flange is formed with a rim through which the connecting bolts are passed. The cupped ring may be made thicker in the middle than at the sides, as the latter only need be flexible, the metal preferably tapering to the edges and the sides spreading out so that on tightening up the joint the sides are slightly compressed and the edges caused to bite against the sides of the recess.

The metal ring acts much in the same manner as a cup leather but withstands high temperatures as well as high pressures and does not deteriorate rapidly. The internal pressure causes the flexible sides to be pressed more tightly against the walls of the recess, so that the only effect of increased pressure is to increase the tightness of the joint but the resiliency of the hard metal is relied on for the joint as distiguished from prior proposals in which cupped rings of lead or other relatively soft and deformable metal are employed.

In order that the said invention may be clearly understood and readily carried into effect I will describe the same more fully with reference to the accompanying drawings, in which:—

Figure 1 is a section of a pipe provided with the improved joint, and

Fig. 2 shows the application of the metal packing ring to the joint between the inspection cover and body of an internal combustion engine cylinder.

Referring to the pipe joint, A, A are the pipe ends provided with flanges $a$ connected together by the bolts $a'$ and formed with the recesses B, B which receive the cupped metal ring C. When the pipe ends are tightened up the recesses B form an internal annular channel in which the ring C is compressed so that the tapering sides $c$ press tightly against the walls of the channel. The internal pressure acting upon the inner face of the cupped ring assists in tightening the joint around the ring and owing to the recessed form of the joint movement of the fluid through the pipe sets up eddy motion which prevents risk of the fluid being directed under either edge of the ring and enables the full expanding effect of the pressure to be obtained.

A small annular lip $a^2$ may be formed at the inner edges of the recess B to give increased protection to the edges of the ring C.

In Fig. 2 the arrangement of ring C and recess or channel B is substantially the same as in the construction just described but the channel is formed at the annular joint between the inspection cover D and the end of the cylinder D' of an internal combustion engine. The internal pressure in the cylinder D' causes expansion of the cupped ring C and maintains the joint at $d$ tight. The cover is secured in place by the screw studs $d'$.

What I claim and desire to secure by Letters Patent of the United States is:—

1. A fluid tight joint of the kind set forth comprising a pair of jointed flanged members adapted to produce between the adjacent faces of the flanges a single joint and an annular channel, a cupped flexible walled ring of a hard and resilient metal placed in the said channel and supported by said jointed members so that the portion of said ring extending between the walls covers the joint between the meeting faces of the flange portions of the jointed members, and means for connecting the said jointed members so as to compress the sides of the said ring against the elastic resistance of the metal for the purpose specified.

2. A fluid tight joint of the kind set forth, comprising a pair of jointed flange members adapted to produce between the adjacent faces of the flanges a single joint and an annular channel, a small annular lip on each of the said members at the inner edge of said channel, a cupped flexible walled ring of a hard and resilient metal in said channel, and inclosed by the annular lips on said jointed members, said ring being supported by said jointed members so that the portion of the ring extending between the walls covers the joint between the meeting faces of the flange portion of said members, and means for connecting the said jointed members to compress the sides of said ring against elastic resistance of the metal for the purpose described.

THOMAS GREGORIE TULLOCH.